United States Patent
Mourlon et al.

[15] 3,635,342
[45] Jan. 18, 1972

[54] METHOD AND APPARATUS FOR RECOVERING A SUBSTANCE FLOATING AS A SHEET ON THE SURFACE OF A LIQUID MASS

[72] Inventors: Jean-Claude Mourlon, Saint-Germain-en-Laye; Ernest Marie Rene Dubois, Sceaux, both of France

[73] Assignee: Bertin & Cie, Plaisir, France

[22] Filed: Dec. 22, 1969

[21] Appl. No.: 887,297

[52] U.S. Cl. .......................... 210/84, 210/242, 210/DIG. 21
[51] Int. Cl. .............................................................. C02c 1/38
[58] Field of Search ..................... 210/242, 83, 84, 219, 208, 210/65, 170, 512

[56] References Cited

UNITED STATES PATENTS

| 3,215,272 | 11/1965 | Sweeny | 210/84 |
| 2,876,903 | 3/1959 | Lee | 210/242 |
| 3,348,690 | 10/1967 | Cornelissen | 210/242 |

*Primary Examiner*—J. L. DeCesare
*Attorney*—Brufsky, Staas, Breiner and Halsey

[57] ABSTRACT

For recovering a substance, more especially a hydrocarbon, spread as a thin sheet and floating on the surface of a liquid, the liquid is, in the vicinity of its surface, subjected to a local rotating movement so as to bring about the formation of a vortex-type cavity which is open and has a vertical axis, and in which the substance originating from the sheet accumulates, and from the said cavity the accumulated substance is extracted, the amount extracted being automatically replaced, as it is extracted, by further substance emanating from the sheet.

15 Claims, 37 Drawing Figures

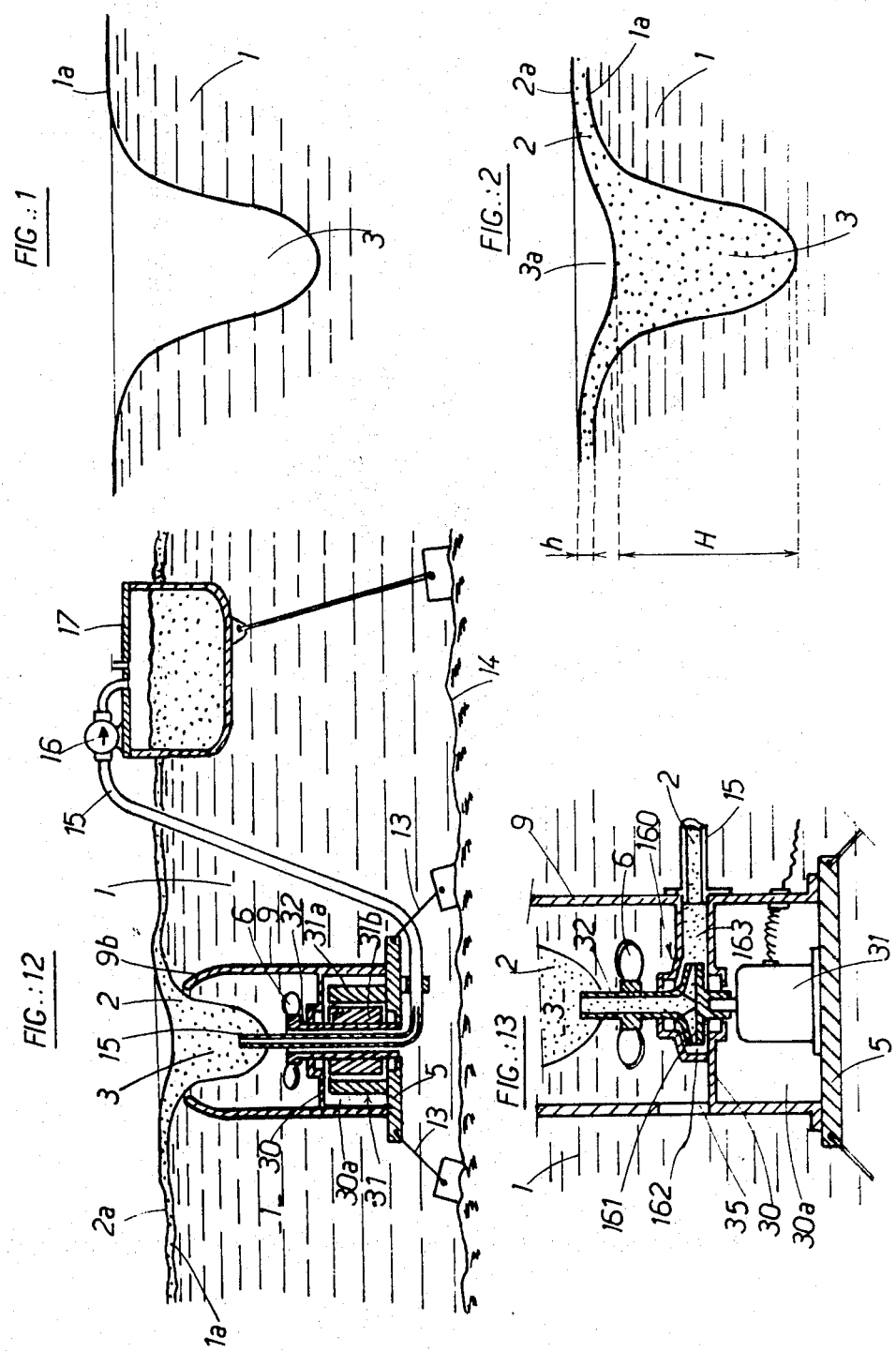

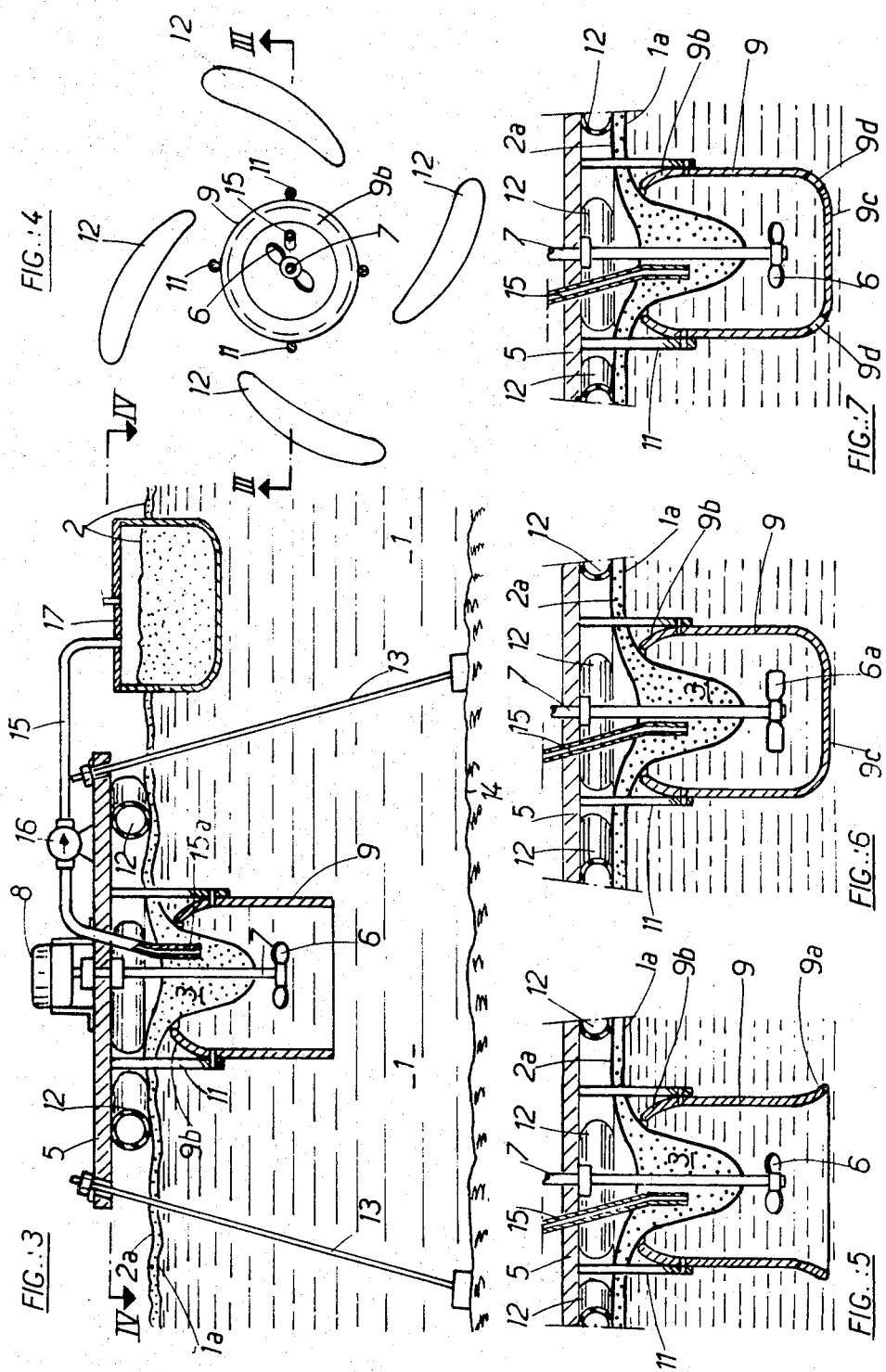

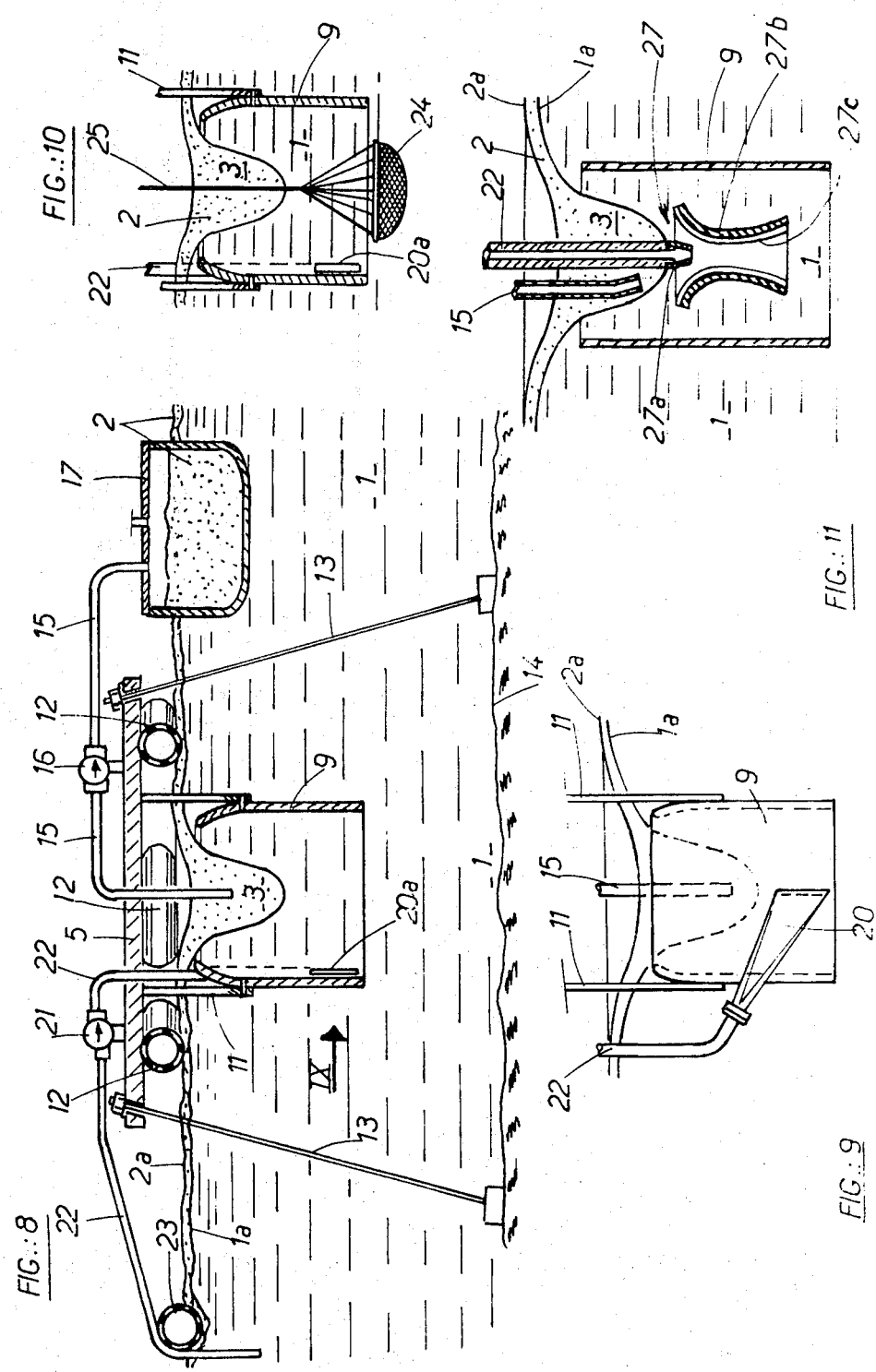

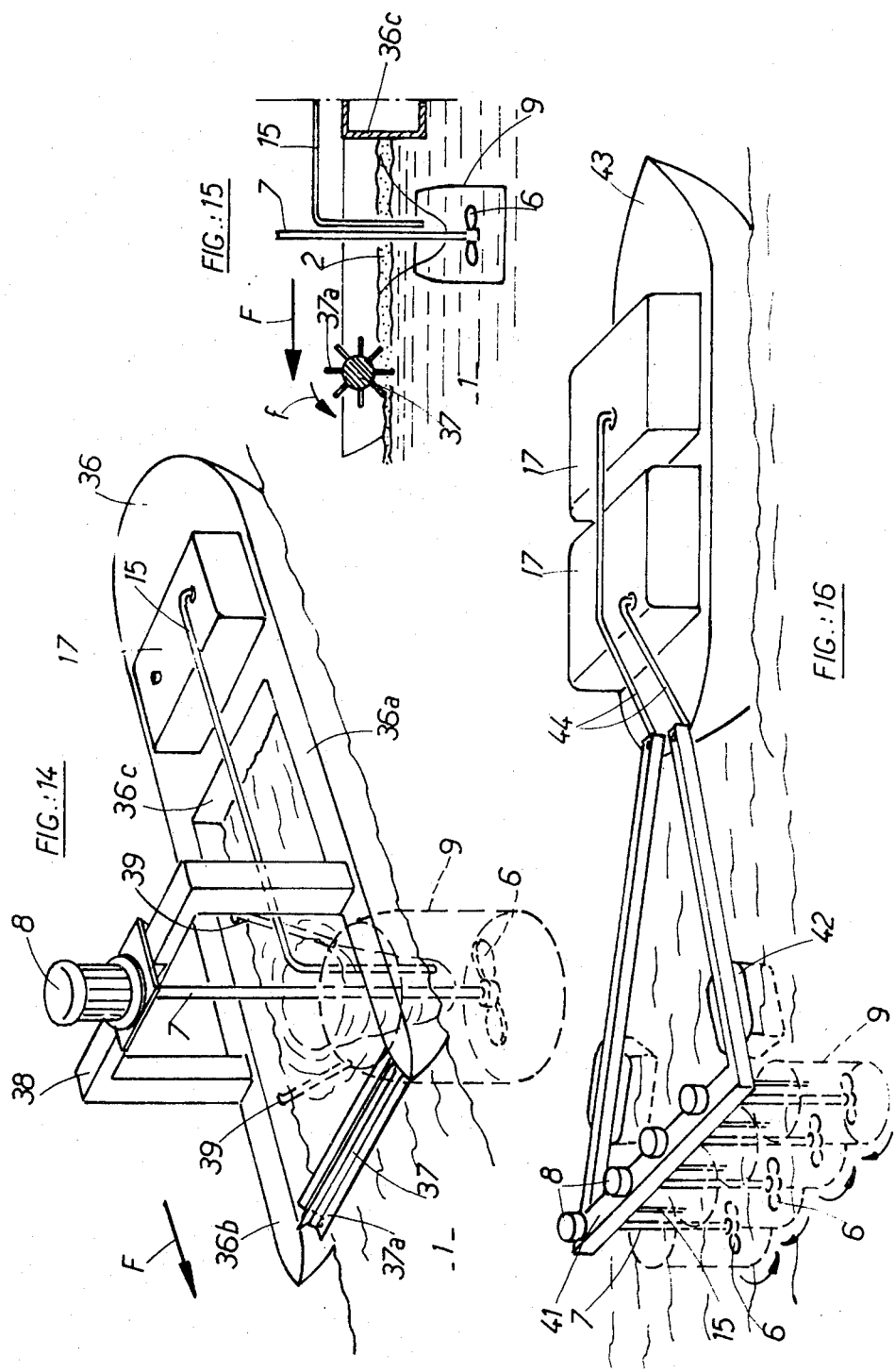

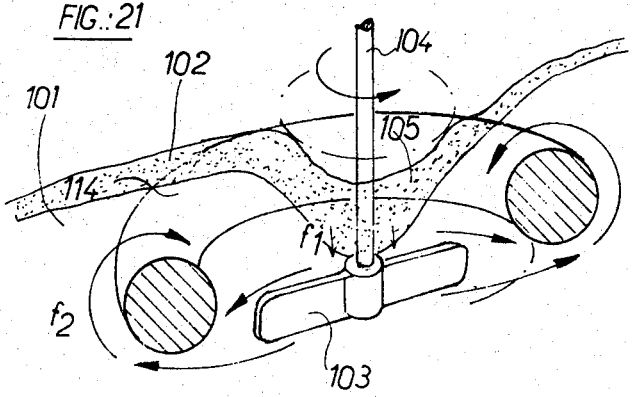
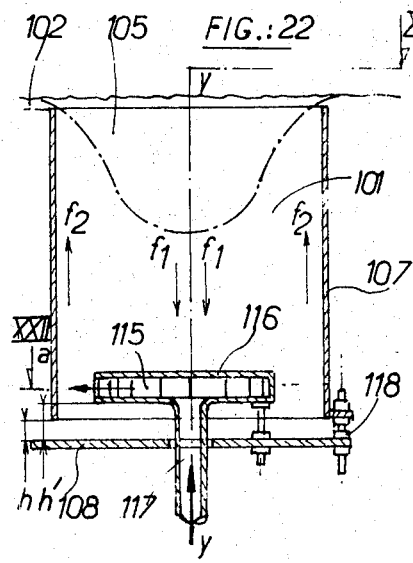
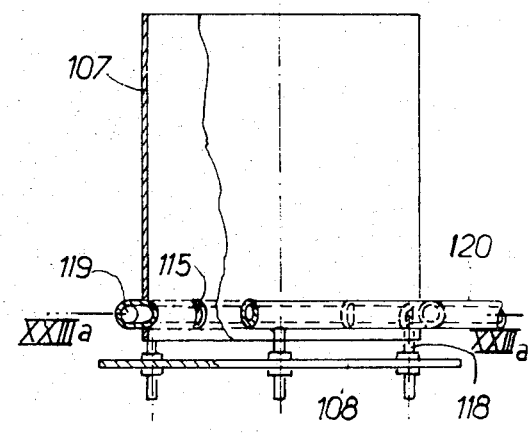
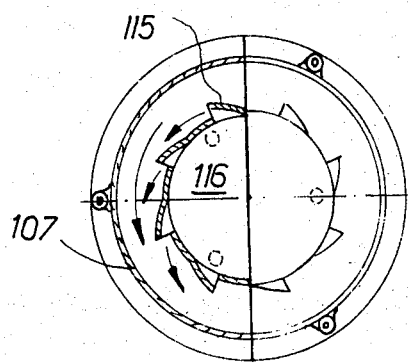
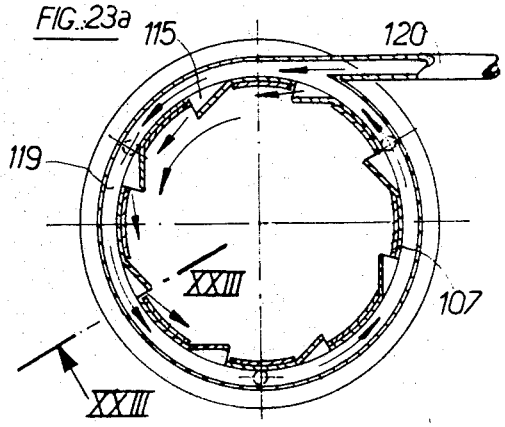

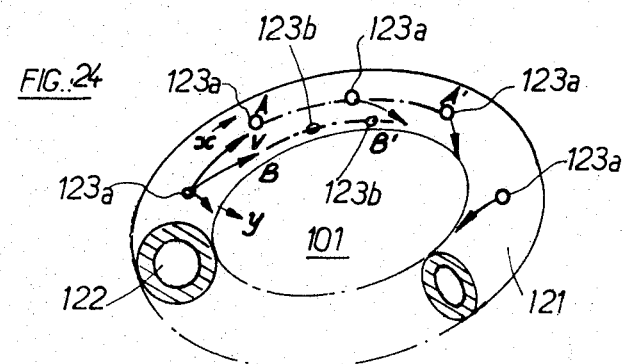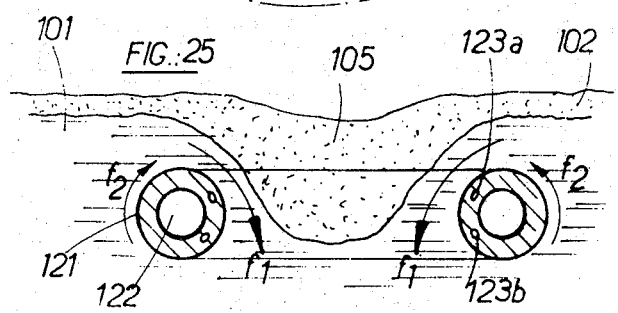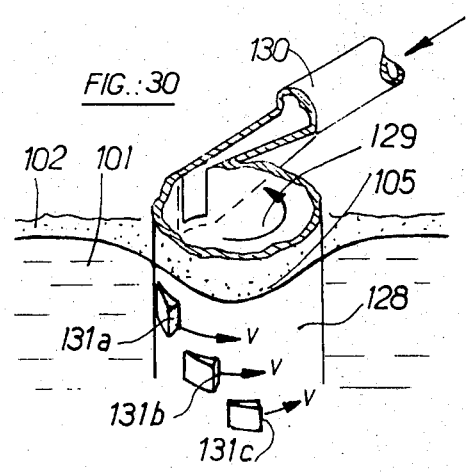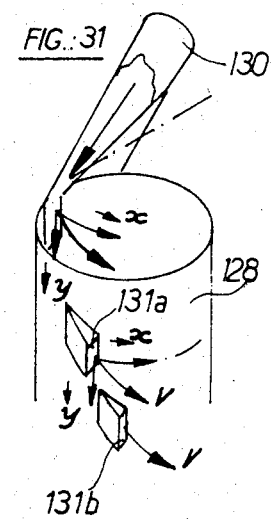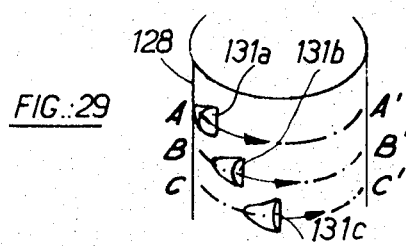

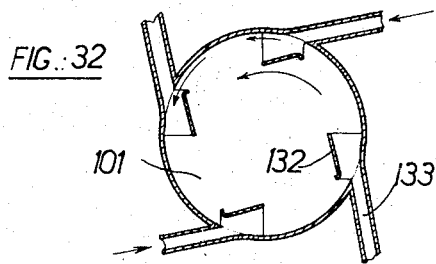
FIG.:32
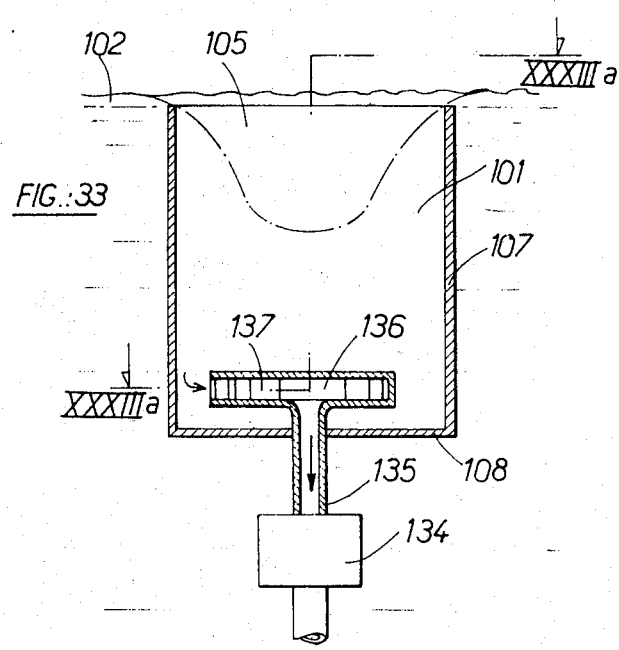
FIG.:33
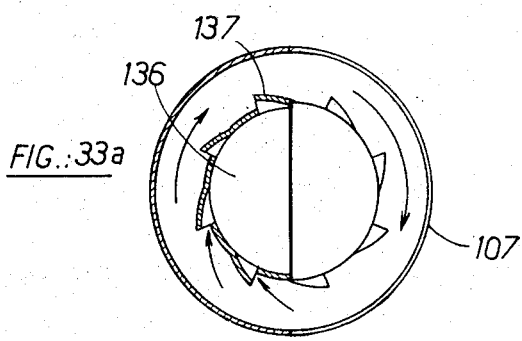
FIG.:33a

METHOD AND APPARATUS FOR RECOVERING A SUBSTANCE FLOATING AS A SHEET ON THE SURFACE OF A LIQUID MASS

This invention relates to a method and apparatus for recovering a substance spread as a thin sheet covering a large area and floating on the surface of a liquid mass.

The said substance may be a liquid or, on occasion, a solid in the divided state, less dense than the liquid on which it is spread and not miscible with it. The invention may be applied with good advantage, but not exclusively, to the clearing of pollution from water contaminated by hydrocarbons, oil, crude petroleum or similar substances. In what follows, for the sake of simplicity the terms "water" and "hydrocarbon" will signify respectively the liquid mass and the substance floating on the surface of the said mass, but it will be clear that the use of these terms is not intended to be of a restrictive nature.

At sea, in the vicinity of coastlines, in ports, basins, lakes, watercourses, canals and in a general way for any mass of liquid, the problem is frequently faced of clearing the surface of pollution. This clearance is all the more difficult to carry out in that the thickness of the polluting substance is minimal and in that the surface area polluted is very considerable.

Known methods for recovering pollutants by a mechanical technique have generally proved of modest effectiveness and also burdensome, because of of their low efficiency and the treatments that are required to separate the constituents of the mixture collected. As to chemical methods, they are themselves often a cause of secondary pollution.

The object of the invention is to provide a method and apparatus of high efficiency and modest recovery costs, and that substantially avoids the drawbacks set out above. The method according to the invention essentially consists in subjecting the liquid, in the vicinity of its surface, to a local rotating movement about at least one substantially vertical axis, so as to bring about a downward pull on whorls or curls of the liquid and the formation, at the surface of the liquid, of at least one open cavity flaring upwards and outwards, into which the substance originating from the polluting sheet flows and accumulates, acquiring a thickness greater than that of the sheet thereof, and in extracting from the said cavity the substance accumulating thereat, the amount extracted being automatically replaced, as it is extracted, by further substance emanating from the sheet.

The apparatus according to the invention essentially comprises swirl-inducing means to subject the liquid, in the vicinity of its surface, to a local rotating movement about at least one substantially vertical axis, so as to bring about a downward pull on whorls or curls of the liquid and the formation, at the surface of the liquid, of at least one open cavity flaring upwards and outwards, into which the polluting substance from the sheet flows and accumulates, acquiring a thickness greater than that of the sheet thereof, and means for extracting from the said cavity the substance accumulating there, the amount extracted being automatically replaced, as it is extracted, by further substance emanating from the sheet.

Among the swirl-inducing means which may be employed there figure, more especially, means such as screw propellers, bladed wheels, pumps, and nozzles to inject a swirl-inducing fluid, the positioning of these means, in accordance with the invention, being explained in detail hereinafter.

Certain arrangements of the invention more particularly relate to improvement in the conditions of circulation of the whorls of liquid drawn downwards, more especially by virtue of the setting up for the said whorls of a forced recirculation, possibly with an adjustable character, the forced recirculation being facilitated by the presence of confining or guiding walls.

Other arrangements of the invention more particularly have a bearing on increasing the efficiency of the extraction of the pollutant by bringing into action suitable separating walls which render it possible to prevent interaction between the respective flows of the liquid undergoing recirculation and of the substance then being subjected to the extraction process.

The following description relating to the accompanying drawings, which is given by way of nonlimitative example, will indicate how the invention may be carried into practice.

In the drawings:

FIG. 1 is a diagrammatic view of a cavity created at the surface of a liquid by causing the latter to rotate locally about a vertical axis;

FIG. 2 is a view similar to FIG. 1 but relating to the case in which the liquid is covered by a thin sheet of a light substance;

FIG. 3 is a view, in section taken along the line III—III in FIG. 4; of one embodiment of apparatus according to the invention;

FIG. 4 is a fractional view of a section taken along the line IV—IV in FIG. 3;

FIGS. 5, 6 and 7 are fractional views, similar to that in FIG. 3, illustrating three modified embodiments respectively;

FIG. 8 is a view in section of another embodiment of the apparatus according to the invention;

FIG. 9 is a fractional view from outside following the arrow IX in FIG. 8;

FIGS. 10 and 11 are fractional views, similar to that in FIG. 8, illustrating two modified embodiments respectively;

FIG. 12 is a view in section of another embodiment of the apparatus according to the invention;

FIG. 13 is a fractional view, similar but on a larger scale, illustrating a modified embodiment;

FIG. 14 is a view in perspective of another embodiment of the apparatus according to the invention;

FIG. 15 is a diagrammatic fractional view, on a reduced scale, of a longitudinal section taken along the apparatus in FIG. 14;

FIG. 16 is a view in perspective of another embodiment of the apparatus according to the invention;

FIG. 21 is a diagrammatic view in perspective of pollutant-recovery apparatus fitted with means to recirculate the liquid which correspond to another modified version;

FIG. 22 is a view similar to FIG. 17, showing, on the one hand, an improvement in the means for recirculating the liquid and, on the other hand, an improvement in the swirl-inducing means, involving nozzles for injecting fluid with a swirl-inducing effect;

FIG. 22a is a section taken along the line XXIIa—XXIIa of the apparatus depicted in FIG. 22;

FIG. 23 is a view in elevation, partly in a section taken along the line XXIII—XXIII in fig. 23a, of a device according to one modified version of the preceding apparatus;

FIG. 23a is a view of the apparatus depicted in FIG. 23 but in a section taken along the line XXIIIa—XXIIIa;

FIG. 24 is a diagrammatic view in perspective illustrating another arrangement of the nozzles for injecting the swirl-inducing fluid;

FIG. 25 is a view in elevation showing in section the device depicted in FIG. 24;

FIG. 29 is a diagrammatic view and showing another arrangement of the nozzles for injecting the swirl-inducing fluid;

FIGS. 30 and 31 are views in perspective of two modified embodiments of the arrangement shown in FIG. 29;

FIG. 32 is a diagrammatic view illustrating one particular embodiment of the nozzles for injecting the swirl-inducing fluid;

FIG. 33 is a view in section illustrating another embodiment of the swirl-inducing means; and FIG. 33a is a view of the device shown in FIG. 33 in a section taken along the line XXXIIIa —XXXIIIa.

Figure 19:
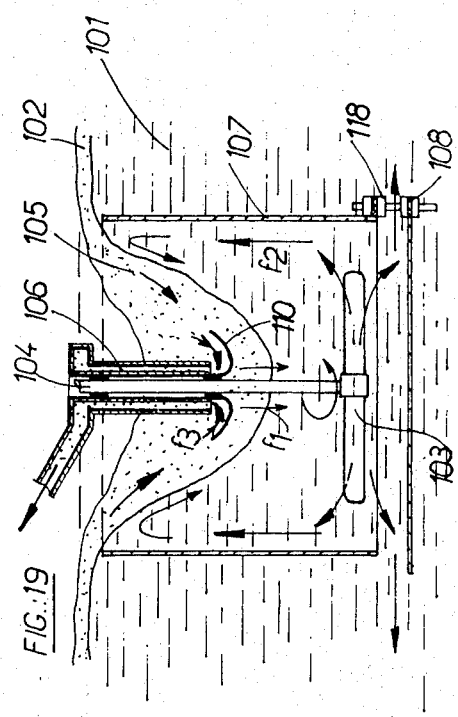
FIGS. 19 and 20 are views similar to FIG. 17 and showing, in particular, according to two modified versions, means rendering it possible to decrease interactions between, on the one hand, the said recirculation and, on the other hand, the extraction process relating to the substance accumulated in the cavity formed at the surface.

The thickness of the thin sheet of substance floating on the surface of the dense liquid has intentionally been reproduced in a rather exaggerated manner to provide a better understanding of the drawings. It can naturally be much thinner. Hereinafter the expression "vortex" will signify the phenomenon of rotational motion imparted to the liquid through means to be detailed hereinafter.

In FIG. 1 is shown a cavity 3 created by a vortex at the free surface 1a of a liquid mass 1. The cavity 3 has substantially the form of a paraboloid of revolution, which leads to the free surface 1a of the liquid 1 by an evolute surface with a slope decreasing progressively.

In FIG. 2 may be seen a thin sheet made up of a substance 2 lighter than the liquid 1 and nonmiscible with the latter, the former covering the free surface 1a of the liquid 1. The substance 2 tends to fill the cavity 3 brought into being by the vortex, in order thus to possess minimum potential energy. It is, on the other hand, set rotating by the vortex, but at an angular velocity smaller than that affecting the particles of liquid 1 inside the vortex for an identical distance from the axis of rotation of the substance 2 and of the liquid 1. The more viscous and lighter is the substance 2 the smaller will be the said velocity for a given speed of the liquid 1 at a given distance from the axis of rotation. A stable balance is set up, in accordance with which a cavity 3a is formed on the free surface 2a of the thin sheet of the substance 2, which cavity is however less deep than the cavity 3. The thickness H of the volume of substance 2 in the vortex zone is therefore very great in relation to the thickness h of the sheet of substance 2 outside the vortex. The substance 2 may be a liquid, for example a hydrocarbon. It may also be a solid substance finely dispersed over the surface of the liquid 1.

FIGS. 3 and 4 show a first embodiment of a device according to the invention.

Here may be seen a platform 5 supported by floats 12 above a mass of liquid 1, itself supported on a bottom 14. The platform 5 is connected to the bottom 14 by an anchoring device 13, and it carries swirl-inducing means constituted, in the example shown here, by a screw propeller 6.

The screw propeller 6, dipped down into the liquid mass 1 at a suitable distance from its free surface 1a, is caused to rotate by a motor 8, carried by the platform 5, through the agency of a shaft 7 which is substantially vertical. The screw turns in a direction such that it exerts a downward pull on the whorls or curls of liquid 1 sucked in between the screw and the free surface 1a. The screw is surrounded by a fairing, shroud or streamlined skirt 9 connected to the platform 5 by means of rods 11. The fairing 9 is dipped completely in the liquid 1, and its free upper edge 9b, preferably located in the vicinity of the free surface 1a of the said liquid 1, is conveniently bent over towards the inside of the said fairing. The latter is open at its lower end. A pipe 15a runs from the vicinity of the shaft 7, inside the space where it is desired to create the cavity 3. The pipe is connected to a floating tank 17 by means of a pipe 15 associated with a pump 16 carried on the platform 5 and delivering fluid to the said tank 17, the assembly constituting, as can be seen, a means of extracting the substance 2 which has accumulated in the cavity 3.

The shape of the floats 12 is preferably a curved one, and their arrangement is such that each float is located substantially on a spiral corresponding to the whorls of fluid around the vortex, so as to affect their flow as little as possible.

The area in which the pollutant-recovery device according to the invention is at work may be surrounded by protective devices (not shown) which are intended to improve the efficiency of the said device within the said area; these are, for example, and without implying any limitation, immersed protective nets, floating barriers made up, for example, of elongated bodies which surround, contain or assemble the sheet of substance 2 in one spot, and devices acting as markers. It is also possible to envisage a system of immersed ducting surrounding the vortex at a suitable distance and emitting a curtain of bubbles so as to isolate a portion of the sheet of light substance 2.

The operation of the above-described pollutant-recovery device is as follows. The platform 5 is brought to the area requiring treatment, and is anchored. The motor 8 is started up, this turning the screw 6. A vortex is thus created, this bringing about the formation of the cavity 3. The light substance 2 tends to fill the said cavity. The pump 16 is started up and is adjusted to a suitable flow rate, so extracting the substance 2 accumulated in the cavity 3 and then despatching it to the tank 17. The substance 2 extracted from the cavity 3 is immediately replaced from that remaining on the surface, so as to maintain the balance until the thin sheet has been exhausted over a large surface area around the vortex.

The fairing 9 makes it possible to limit the volume of liquid 1 set in motion, and consequently to limit the power of the motor. The curve of the upper portion 9b of the fairing 9 facilitates the urging of the thin sheet of substance 2 towards the vortex.

FIGS. 5 to 7 show modified embodiments of the fairing 9.

According to FIG. 5, the free lower edge 9a of the fairing 9 is bent out towards the outside of the said fairing. This arrangement makes it possible to guide to good advantage the fluid whorls emerging from it.

According to FIG. 6, the fairing 9 includes a bottom 9a which makes it possible to limit the volume of fluid set in motion virtually to the volume of the said fairing. In this embodiment, the screw is replaced by flat blades 6a.

According to FIG. 7, the fairing 9 includes a bottom 9c through which is formed at least one orifice 9d.

FIGS. 8 and 9 show another embodiment which differs from the preceding one essentially through the fact that the swirl-inducing means here comprises, in place of the screw 6 or the blades 6a, a nozzle 20 which opens into the fairing 9 by way of a slot 20a and makes it possible to inject a swirl-inducing fluid tangentially to the wall of the said fairing. The axis of the nozzle is preferably slanted slightly downwards. The swirl-inducing fluid can to good advantage be made up of a liquid of the same nature as that of the liquid mass 1. With this end in view, in order to keep the said nozzle supplied, it is possible to provide a pipe 22 whose free upstream end, maintained at a distance from the platform by a float 23, dips down into the liquid mass 1. A pump 21 is interposed in the pipe 22. The nozzle 20 may also be connected to some other source of pressurized fluid.

The slot 20a extends parallel to the axis of the fairing 9 and substantially within the lower half of the latter. It may naturally extend over the entire height of the fairing. The extraction of the substance 2 is, as in the preceding case, ensured by means of the pipe 15 associated with the pump 16 and the tank 17.

When the pump 21 is started up, a jet of pressurized liquid 1 is delivered at a tangent inside the fairing 9 via the slot 20a, driving round the mass of liquid located within the fairing 9, and a vortex is formed.

FIG. 10 illustrates a modified embodiment of the extraction apparatus for the light substance 2, with advantage applied to the case in which the substance 2 is made up of solid particles. A filtering device 24 made up of a net of very small mesh and linked with the platform 5 by a cable 25 is placed below the fairing 9, in the vicinity of and opposite to its lower free edge. Its dimensions are such that it can be shifted up inside the fairing 9. To pick up the particles of substance 2 accumulated in the cavity 3, it is sufficient to raise the filtering device 24.

FIG. 11 shows diagrammatically a modified embodiment according to which a swirl-inducing nozzle 27a cooperates with a fairing 27b of convergent-divergent configuration in such a way as to constitute an aspirator device 27 arranged along the axis of the fairing. The fairing 27b is fitted on its inner wall with inclined or screw-shaped vanes 27c. The nozzle 27a may be supplied, through the agency of a pipe 22, by means of a pump similar to the pump 21 shown in FIG. 8. It may also be connected to some other source of pressurized fluid. In operation, the suction effect brought about by the aspirator device 27 leads to the formation of a vortex, hence the cavity 3. The upper edge of the fairing 9 shown in FIG. 11 is straight, and is not bent inwards.

Naturally the aspirator device 27 may be of any known type; in particular, it may be an aspirator device with a divergent fluid spray brought into being by annular swirl-inducing nozzles.

In the embodiment shown in FIG. 12, the platform 5 is immersed in the liquid 1 and is connected to the bottom 14 by the anchoring device 13. The fairing 9 is fastened above the platform 5, and the upper free edge 9b of the said fairing is located in the vicinity of the surface 1a. A partition 30 makes it possible to form, along with the platform 5 and the fairing 9, a fluidtight chamber 30a inside the lower part of the said fairing. A motor 31 placed inside the chamber 30a includes a stator 31a and a rotor 31b. A hollow shaft 32, rigid with the rotor 31b, passes through the partition 30 in a fluidtight manner, extending as far as the space located above the chamber 30a. Its free end carries a screw propeller 6. The pipe 15 for carrying away the light substance 2 is placed inside the shaft 32 and opens into the cavity 3. It is linked with the tank 18 and with the pump 16, which in this embodiment is carried on the tank.

FIG. 13 shows a modified embodiment in which the hollow shaft 32 is employed simultaneously to drive the propeller 6 and the blades 161 of a centrifugal pollutant extracting pump 160 The shaft 32 is driven by the motor 31 placed in the fluidtight chamber 30a. It is extended as far as the cavity 3, so as to serve as an intake pipe for the pump 160. The blades 161 turn inside a diffusion chamber 162 which feeds a delivery pipe 163 from the pump. The pipe 15 directly links the pipe 163 and the tank 17 (not shown in FIG. 13). An orifice 35 is formed in the lateral wall of the fairing 9 in the vicinity of the partition 30, so as to put the interior of the said fairing in communication with the liquid mass 1 situated outside the latter.

FIGS. 14 and 16 show a further embodiment of the apparatus according to the invention. In this embodiment, the platform is replaced by a boat 36 of "Catamaran" type, the two hulls 36a and 36b of which are interconnected by a structure 36c. A cylindrical wheel 37 carrying flat blades 37a is able to rotate between the two hulls 36a and 36b at the bow. A gantry 38 situated between the wheel 37 and the structure 36c and rigid with the hulls 36a and 36b supports the motor 8. As in the first embodiment, this motor drives the immersed screw propeller 6 by means of the shaft 7. The fairing 9 surrounding the propeller 6 is connected to the hulls 36a and 36b by fastening devices 39. The pollutant-extraction pipe 15 is connected to the tank 17 by means of a pump (not shown).

Operation is as follows:

The boat 36 proceeds in the direction shown by the arrow F into the area requiring treatment. The bladed wheel 37 turns in the direction shown by the arrow f because of the resistance to the advancing movement put up by the liquid 1 and the sheet 2. The sheet 2 can penetrate into the space located between the hulls 36a, 36b, the wheel 37 and the structure 36c, but cannot escape therefrom. The substance 2 therefore accumulates there. When the amount of substance 2 accumulated in this way is sufficiently large, the boat 36 is stopped and the motor 8 along with the pump linked to the tank 17 is rendered operative, so as to despatch the substance 2 into the said tank, as has already been described hereinbefore. The boat can in this way be shifted across all the area requiring treatment.

In the embodiment described in FIG. 16, a support 41 associated with floats 42 is drawn along by a boat 43. Four motors 8 associated with four screw propellers 6 by means of four shafts 7 are carried by the support means 41. Two consecutive shafts rotate in opposite directions. Each propeller 6 is associated with one fairing 9 and with an intake pipe 15 connected to manifolds 44 which open into tanks 17 carried by the boat 43. Each tank is fitted with a suction pump (not shown). This arrangement has the advantage that it operates without stopping the boat, the latter proceeding very slowly in the area requiring treatment. Naturally, any number whatever of propellers may be used.

Figure 17:
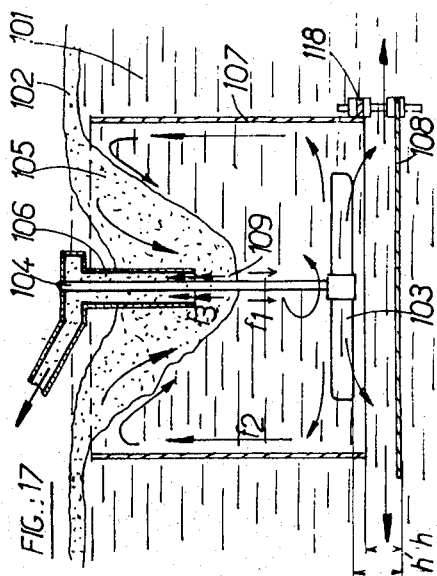
FIG. 17 shows diagrammatically in elevation a section through pollutant-recovery apparatus according to the invention, more especially demonstrating the setting up of a forced recirculation in the liquid mass.

In FIG. 17, the reference numeral 101 has been used to designate the liquid mass, so-called "water," covered over by a thin sheet 102 of a substance called "hydrocarbon," which is less dense than the liquid mass, is in the divided or liquid state, and is nonmiscible with the first-mentioned liquid.

Swirl-inducing means, made up, for example, of a screw propeller 103 or a flat blade driven by a shaft 104, make it possible to bring about, in the mass of water, the formation of a vortex with a downward pull on the liquid whorls shown diagrammatically by the arrows $f_1$. In operation, on the surface of the water there forms a cavity 105 in which the hydrocarbon accumulates with a thickness much greater than that of the main sheet, this feature facilitating its extraction, for example through a pumping action, by way of a pipe 106 surrounding the shaft 104.

A fairing 107 laterally surrounds the swirl-inducing means 104, and on the other hand, below the said swirl-inducing means and preferably below the said fairing, there is provided a wall 108 which forms a generally horizontal surface. By this means, around the swirl-inducing means there is defined a certain enclosed space in which a local recirculation movement—symbolized by the arrows $f_2$—of at least one portion of the liquid whorls $f_1$, can occur.

The existence of this recirculation is, in principle, favorable to the efficiency of the installation because, with everything otherwise being equal, it renders it possible to decrease the power of the motor means that must be activated to bring about the swirl-inducing effect desired. The wall 108 is arranged at a distance $h$ from the lower free edge of the fairing 107 and at a distance $h'$ below the swirl-inducing means 103. The distances $h$ and $h'$ may be adjusted by means such as a threaded rod 118, this making it possible, while taking account in particular of the characteristics of the substances then present and more especially of their respective densities (on which depend the geometrical and hydrodynamic characteristics of the vortex cavity 105), to modify the rate of recirculation of the denser liquid.

Figure 18:
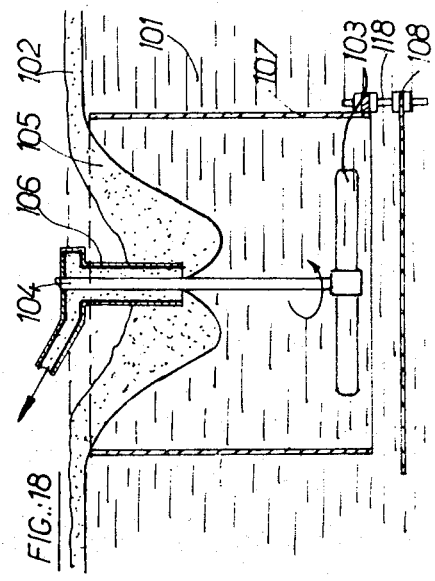
FIG. 18 is a complementary diagram explaining FIG. 17.

The arrangement shown in FIG. 17 may nevertheless have some drawbacks when the extraction of the hydrocarbon is proceeded with. There then occurs at the intake to the pipe 106 a flow $f_3$ contrary in direction to the flow $f_1$, this running the risk of giving rise, in an area 109 included between the bottom of the cavity 105 and the intake to the pipe 106, to an interaction between the two flows that entails certain losses. Apart from this, and as FIG. 18 demonstrates, the action of swirl induction brought about by the means 103 is counteracted by a swirl-inducing action in a contrary direction due to the relative underpressure prevailing at the intake to the pipe 106, which may, put briefly, lead to inopportune extractions of water along the said pipe.

FIG. 19 shows a simple arrangement which renders it possible to a large extent to obviate the drawback mentioned above; according to this arrangement a separating wall 110, which is advantageously in the form of a cup substantially parallel to the bottom of the cavity 105, is mounted between the swirl-inducing means 103 and the pollutant-extraction pipe 106, in the immediate vicinity of the intake to the latter. The said cup-shaped unit guides the flow $f_3$ of hydrocarbon, which no longer interferes with the recirculation flow $f_1$, $f_2$, and also makes it possible to eliminate the above-mentioned swirl-inducing action in the contrary direction.

Figure 20:
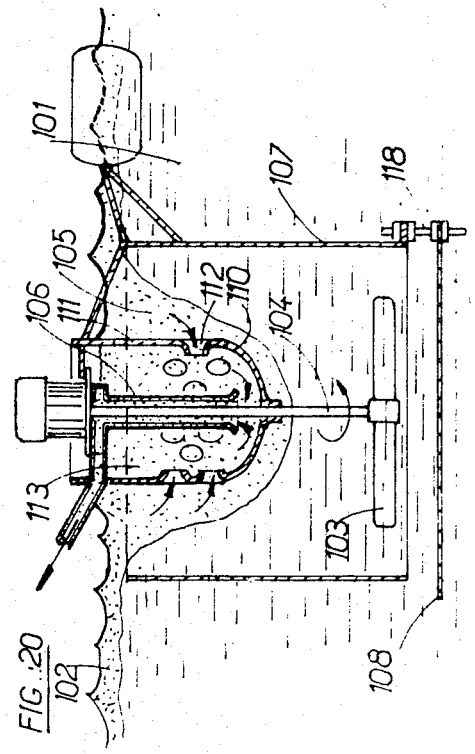

FIG. 20 relates to a modified version of the preceding arrangement, according to which the cup 110 is continued upwards by a lateral wall 111 which preferably crosses the hydrocarbon/air interface and is pierced with orifices 112 for the passage of the hydrocarbon. In the heart of the cavity 106 there is therefore confined a settling chamber 113 in which any possible swirling movement of the hydrocarbon is nullified or greatly reduced, this leading to an increase in the efficiency of the pumping out of the hydrocarbon. Apart from this, the wall 111 forms a screen against agitating surface movements which might have the effect of bringing about a vertical displacement of the cavity 105 and consequently, on certain occasions, an inopportune pumping of water.

FIG. 21 relates to a modified version of the invention, according to which the recirculation $f_2$ of the whorls of liquid is favored by the presence of a convex wall 114 which is adapted to cause at least a proportion of the whorls $f_1$ of liquid to deviate because of the "attachment" of the latter to the said wall, this phenomenon being sometimes called the Young effect. The wall 114 may advantageously form part of the outer surface of a torus with a substantially vertical axis, and surrounding the swirl-inducing means 103.

FIGS. 22 to 32 relate to various improvements concerning the swirl-inducing means, in the case in which these latter comprise nozzles intended for the injection of suitably oriented jets of swirl-inducing fluid into the mass of water.

In FIGS. 22 and 22a are shown a plurality of nozzles 115 distributed in a circle around an axis Y—Y which is substantially vertical, and within a space bounded, as in the case of FIGS. 1 to 4, by a lateral fairing 107 and a generally horizontal wall 108. The latter is, as in the preceding case, arranged at adjustable distances $h$ from the lower free edge of he fairing, and $h'$ from the swirl-inducing means 115.

The nozzles 115 communicate, through the agency of a central enclosure 116 and of an axial supply pipe 117, with a source (not shown) of swirl-inducing fluid, such as water under pressure. They are made to point in such a way that the jets they emit possess at least a tangential component and, in certain cases, also a vertical component directed downwards. In the heart of the mass of water 101 these jets induce a swirling motion with a downward pull on the water and with the formation of a cavity 105 for accumulating hydrocarbon.

FIGS. 23 and 23a show a modified embodiment which only differs from the preceding one through the fact that the central enclosure 116 is replaced by a peripheral enclosure 119 into which tangentially opens a supply pipe 120 for swirl-inducing fluid. The latter thus offers, upon its entry into the nozzles, the desired tangential component.

FIGS. 24 to 31 relate to embodiments of swirl-inducing means, according to which a plurality of swirl-inducing means are distributed along one or more parallels of a surface of revolution with a substantially vertical axis.

According to FIGS. 24 to 28, the said surface of revolution is a torus 121 similar to the torus 114 shown in FIG. 21, but the hollow interior 122 of which communicates with a source of swirl-inducing fluid which is not shown.

With a distribution along one or more parallels AA', BB', etc., through the wall of the torus have been drilled a number of inclined passages, such as those at 123a, 123b, etc., forming nozzles for the injection of swirl-inducing fluid and each of them pointing in a direction V which possesses at least one component "$x$" along the parallel (for example AA') and one component "$y$" along the meridian (or circle generating the torus) passing through the nozzle under consideration. The jets of swirl-inducing fluid escaping from the said nozzles thus induce in the heart of the mass of water a general spiralling movement from the outside towards the inside of the torus and from the upper part towards the lower, as the arrows $f_1$ indicate, so bringing about the formation of the pollutant-accumulating cavity 105.

Figure 28:
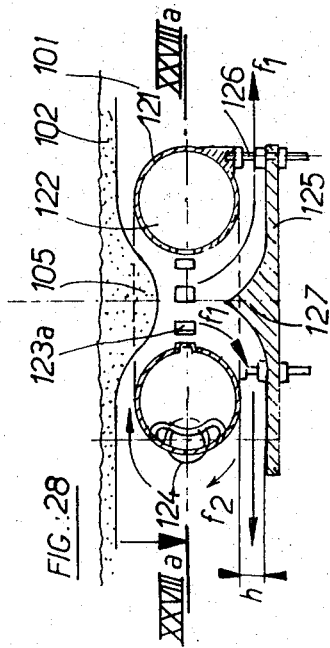
FIG. 28 is a view in vertical section similar to FIG. 27 and depicting a further modified version.
Figure 26:
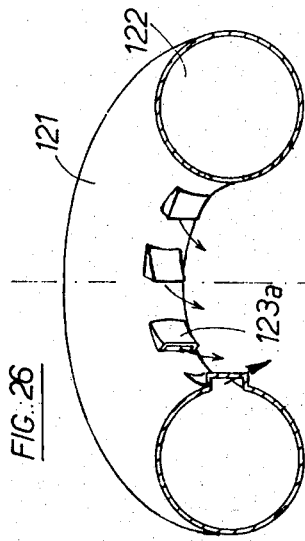
FIG. 26 is a diagrammatic view in perspective, similar to FIG. 24 and showing a modified version.
Figure 27:
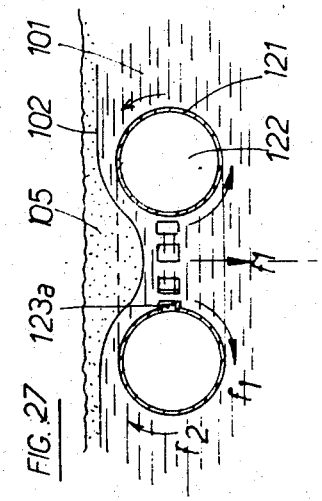
FIG. 27 is a view in vertical section of the device depicted in FIG. 26.

FIGS. 26 to 28 show a modified embodiment of the swirl-inducing means differing essentially from those just described through the fact that, since the wall of the torus is relatively thin, the nozzles, such as the one at 123a, are made up of a system of slots formed in the said wall and deformed so as to give the desired orientation to the jet of swirl-inducing fluid.

Figure 28A:
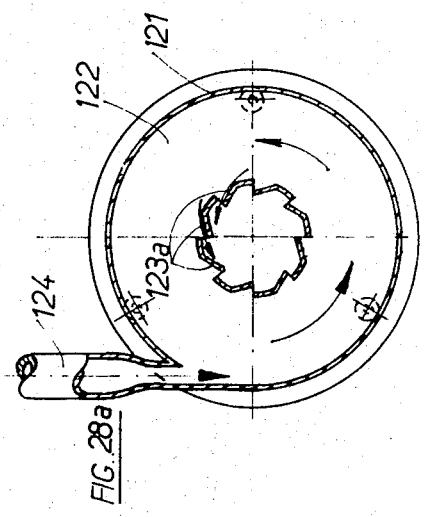
FIG. 28a is a view of the device depicted in FIG. 28 but in a section taken along the line XXVIIIa—XXVIIIa.

According to FIGS. 28 and 28a, the space 122 inside the torus 121 is supplied with swirl-inducing fluid through a pipe 124 which open tangentially into the said space, so that, as in the case of FIGS. 23 and 23a, the swirl-inducing fluid already has, at the entry to the nozzles 123a, the tangential component desired.

Apart from this, in the case of FIG. 28 the presence will be noted of a lower wall 125 arranged below the torus 121 at a distance "$h$" from the latter, the distance being adjustable with the assistance of means 126 similar to the means 118 described above. The said wall, which is substantially parallel to the horizontal plane of symmetry of the torus, possesses along its median portion a prominence 127 which promotes the guidance of the whorls $f_1$ of liquid. As in the preceding instance, the rate of recirculation $f_2$ may be changed by adjusting the gap "$h$."

FIGS. 29 to 31 relate to a modified version, according to which the surface of revolution carrying the swirl-inducing means is a hollow cylinder 128 with a substantially vertical axis. The space within the said cylinder, denoted by the reference numeral 129, is supplied with swirl-inducing fluid via a pipe 130 which open tangentially into the said space. The nozzles, which are of the type described in respect of FIGS. 26 and 27, have been designated by the reference numerals 131a, 131b, 131c. As will be seen, these nozzles are distributed along several parallels AA', BB', CC', etc., and are offset in relation to each other, passing from one parallel to the following one.

In every case, the nozzles 131a, 131b, 131c, etc., and the pipe 130 are arranged in a direction having at least one tangential component and, where such applies, a vertical component pointing downwards, as in shown in particular in FIG. 31.

The jets of swirl-inducing fluid escaping from the nozzles impart to the mass of water a spiralling movement which is all the more stable, the more the liquid whorls set rotating tend to become attached to the wall of the cylinder through the so-called Young effect. This spiralling movement in its turn produces a suction effect of water downwards, this leading to the formation of the cavity 105 for accumulating hydrocarbon.

The cylinder 128 may, if so required, be surrounded by a fairing (not shown in FIG. 30) similar to the fairing 107 described hereinbefore.

FIG. 32 relates to a modified embodiment of a nozzle, according to which the latter comprises a divergent portion 132 dipped in the mass of water 101 and supplied, on the one hand, with swirl-inducing fluid through the agency of a pipe 133 and, on the other hand, with water sucked into the said divergent portion by an aspirator effect. By this means the swirl-inducing effect is reinforced in the heart of the mass of water.

In all the cases just envisaged, the supply of swirl-inducing fluid to the nozzles may be continuous or in pulses.

FIGS. 33 and 33a relate to a further embodiment of the invention, according to which the swirl-inducing effect in the heart of the mass of water is obtained by sucking the water downwards by means of a pump 134. The latter is connected via a pipe 135 to an inlet manifold 136 which, through the agency of tangential nozzles 137, communicates with the mass of water 101. In operation, jets of water are sucked tangentially into the manifold 136 by way of the nozzles 137, this giving rise in the mass of water, as in the preceding case, to a vortical flow of a kind to bring about the formation of the accumulation cavity 105.

To obviate any possible interaction with the cavity 105, it will be appropriate to provide for evacuation of water from the pump 134 at an adequate distance from said cavity.

In the preceding description, mention has been made of a thin sheet of light substance 2, 102 dispersed on the surface of the liquid mass 1, 101. It is apparent that the apparatus according to the invention can a "fortiori" be employed in the case in which the said sheet is not a thin one.

We claim:

1. A method for removing from the surface of a deep body of liquid, an immiscible substance overfloating the same and spread thereover as a thin and wide layer, said body of liquid and said layer of substance forming distinct horizontal strata, comprising he steps of locally whirling said liquid close to said surface about a substantially vertical axis to generate a whirlpool producing in said surface a depression of downwardly tapering closed bottom cup-shaped outline into which said overfloating substance is centripetally drawn from the environment of said layer and accumulates in extra thickness compared therewith, discriminatingly extracting from said depression said substance as it accumulates therein, by extracting said substance from a region of said depression located at a distance above said closed bottom cup-shaped outline, without destroying said outline, and allowing free centripetal motion of said substance from said thin and wide layer on the surface of said deep body of liquid towards said depression to feed the same and make up for the extracted amount.

2. Method as claimed in claim 1, wherein said substance is discriminatingly extracted from said depression by suction at a point located in the midst thereof.

3. Method as claimed in claim 1, wherein said liquid is whirled by forcefully driving a portion thereof located adjacent said depression and expelling said portion away therefrom.

4. Method as claimed in claim 3, wherein said liquid portion is forcefully centrifuged with respect to said axis into the surrounding body of liquid.

5. Method as claimed in claim 3, wherein said liquid portion is forcefully entrained downward into the underlying body of liquid.

6. Method as claimed in claim 5, wherein said liquid portion is forcefully entrained in a direction having, in addition to its downward component, a component substantially tangent to said cup-shaped outline.

7. Method as claimed in claim 3, wherein said liquid portion is forcefully entrained by induction of energized fluid blown thereinto.

8. Method as claimed in claim 3, comprising the further steps of recovering part of said liquid portion on its expulsion path, and rediverting said part towards said depression.

9. Method as claimed in claim 8, wherein said recovering step is effected at a lower level, and said rediverting step is effected at an upper level, whereby a vortex circulation of liquid is established in said body of liquid around said depression, in a direction with respect thereto successively outward, upward, and inward.

10. An apparatus for removing from the surface of a deep body of liquid, an immiscible substance overfloating the same and spread thereover as a thin and wide layer, said body of liquid and said layer of substance forming distinct horizontal strata, comprising:

rotary impeller paddle means for locally whirling said liquid close to said surface about a substantially vertical axis to generate a whirlpool producing in said surface a depression of downwardly tapering, closed bottom cup-shaped outline into which said overfloating substance is centripetally drawn from the environment of said layer and accumulates in extra thickness compared therewith, said rotary impeller paddle means being positioned outside said depression at a distance from said cup-shaped outline thereof, and means separate and distinct from said rotary impeller paddle means, for discriminatingly extracting therefrom said substance as it accumulates therein.

11. Apparatus as claimed in claim 10, wherein said rotary impeller paddle means comprises a generally horizontal rotary impeller immersed in said body of liquid at a depth lower than that of said closed bottom of said depression.

12. An apparatus for removing from the surface of a deep body of liquid, an immiscible substance overfloating the same and spread thereover as a thin and wide layer, said body of liquid and said layer of substance forming discrete horizontal strata, comprising:

means for locally whirling said liquid close to said surface about a substantially vertical axis to generate a whirlpool producing in said surface a depression of downwardly tapering closed bottom cup-shaped outline into which said overfloating substance is centripetally drawn from the environment of said layer and accumulates in extra thickness compared therewith, said whirling means being positioned outside said depression at a distance from said cup-shaped outline thereof;

surrounding means for said whirling means, said surrounding means including a top and a bottom portion;

buoyancy means for supporting said surrounding means, the surrounding means and buoyancy means being constructed and arranged whereby the top portion of said surrounding means is maintained submerged below the surface of the deep body of liquid when said buoyancy means are floating in said body of liquid, allowing said immiscible substance on the surface of the deep body of water to move towards said generated whirlpool; and means separate and distinct from said whirling means, for discriminatingly extracting from said depression said immiscible substance as it accumulates therein.

13. Apparatus as claimed in claim 12, wherein said whirling means comprises vortex generating, fluid injector means discharging into said body of liquid.

14. Apparatus as claimed in claim 13, wherein said fluid injector means comprises at least one fluid-injecting nozzle pointing in a direction having a tangential component with respect to said vertical axis.

15. Apparatus as claimed in claim 12, further comprising means for promoting a forced recirculation of liquid in the vicinity but outside of said depression.

* * * * *

UNITED STATES PATENT OFFICE
CERTIFICATE OF CORRECTION

Patent No. 3,635,342                Dated January 18, 1972

Inventor(s) Jean-Claude Mourlon and Ernest Marie Rene Dubois

It is certified that error appears in the above-identified patent and that said Letters Patent are hereby corrected as shown below:

Title page, number [73], "Bertin & Cie, Plaisir, France" should read -- Bertin & Cie, Plaisir, France; and Entreprise de Recherches et D'Activites Petrolieres-ELF, Paris, France --; insert -- [30] Foreign Application Priority Data
         December 23, 1968    France...........180,117
         November 28, 1969    France.........69 41,273 --.

Column 3, line 35, before "less" insert -- far --. Column 5, line 34, after "160" insert a period (.). Column 8, line 3, "open" should read -- opens --; line 22, "open" should read -- opens --. Column 9, line 5, "he" should read -- the --.

Signed and sealed this 3rd day of April 1973.

(SEAL)
Attest:

EDWARD M. FLETCHER, JR.           ROBERT GOTTSCHALK
Attesting Officer                 Commissioner of Patents